US010922301B1

(12) United States Patent
Biton et al.

(10) Patent No.: US 10,922,301 B1
(45) Date of Patent: Feb. 16, 2021

(54) APPARATUS, COMPUTER PROGRAM, AND METHOD FOR TRIGGER-BASED TRACKING OF DATABASE MODIFICATIONS

(71) Applicant: Amdocs Development Limited, Limassol (CY)

(72) Inventors: Eliezer Biton, Pardesia (IL); Avner Fregi Cohen, Elad (IL); Roi Shecwitz, Kibutz Mishmarot (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 355 days.

(21) Appl. No.: 15/220,286

(22) Filed: Jul. 26, 2016

(51) Int. Cl.
*G06F 16/23* (2019.01)
*G06F 11/30* (2006.01)
*G06F 8/61* (2018.01)
*G06F 16/2455* (2019.01)

(52) U.S. Cl.
CPC ............ *G06F 16/2322* (2019.01); *G06F 8/61* (2013.01); *G06F 11/3072* (2013.01); *G06F 16/2365* (2019.01); *G06F 16/24565* (2019.01)

(58) Field of Classification Search
USPC ........................................................ 707/609
See application file for complete search history.

(56) References Cited

U.S. PATENT DOCUMENTS

| 6,999,977 B1* | 2/2006 | Norcott et al. | G06F 17/30 707/999.203 |
| 7,058,615 B2 | 6/2006 | Yao | |
| 7,849,049 B2 | 12/2010 | Langseth et al. | |
| 9,824,128 B1* | 11/2017 | Maluf et al. | G06F 17/2705 |
| 2006/0265706 A1* | 11/2006 | Isaacson et al. | G06F 9/445 717/174 |
| 2007/0067357 A1* | 3/2007 | Clark | G06F 17/30309 |
| 2008/0301168 A1* | 12/2008 | Adler et al. | G06F 17/00 707/999.102 |
| 2009/0013162 A1* | 1/2009 | Nandan et al. | G06F 9/24 713/1 |
| 2010/0088286 A1* | 4/2010 | Bansode | G06F 17/30923 707/667 |
| 2011/0010344 A1* | 1/2011 | Sjogren | G06F 17/30 707/638 |
| 2013/0086576 A1* | 4/2013 | Li | G06F 9/5072 717/175 |
| 2015/0154233 A1* | 6/2015 | Lightner et al. | G06F 17/30 707/609 |

* cited by examiner

*Primary Examiner* — Muluemebet Gurmu
(74) *Attorney, Agent, or Firm* — Zilka-Kotab, P.C.

(57) ABSTRACT

An apparatus, computer program, and method are provided for trigger-based tracking of database modifications. One or more input tables associated with a database are identified. Further, one or mom triggers are generated, based on the one or more input tables. Such one or more triggers are then installed in connection with an application configured for modifying the database. In response to at least one of the one or more triggers being triggered, one or more modifications to the database are tracked. Further, information is stored where such information is associated with the one or more modifications to the database.

12 Claims, 7 Drawing Sheets

APPARATUS, COMPUTER PROGRAM, AND METHOD FOR TRIGGER-BASED TRACKING OF DATABASE MODIFICATIONS

FIELD OF THE INVENTION

The present invention relates to database systems, and more particularly to tracking database modifications.

BACKGROUND

When working with software that accomplishes mission critical, high availability/demand services at a large scale, such as in the telecommunication space, it is important to ensure minimal deployment downtime, typically resulting from ongoing changes in reference data (e.g. business rules, pricing models etc.) performed by multiple sources (e.g. manual changes, application user interfaces, batch operations, internal/external systems, etc.). Since such changes are used by applications, there is a need to have an ability to track and collect the incremental data changes, pack such incremental data changes, and deploy the same in production systems. Further, these capabilities need to be executed with minimal resources and minimal downtime of live systems, while still validating data consistency across several sub-systems in pre- and post-deployment stages. Typically, this is achieved using finger pointing capabilities as to where the changes were made, as well as using the ability to collect such changes in a row level resolution for further deployment on various systems destinations.

Thus, efficient and accurate data transfer is vital in a production life cycle and requires frequent reference data changes to follow the dynamic changes of live production live systems. However, most of the data extraction technics are merely relying upon a full dump of data or pre-defined rules, in order to extract partial of data thereafter. Those solutions are time- and resource-consuming, and usually result in inaccuracies and, therefore, data inconsistency.

There is thus a need for addressing these and/or other issues associated with the prior art.

SUMMARY

An apparatus, computer program, and method are provided for trigger-based tracking of database modifications. One or more input tables associated with a database are identified. Further, one or more triggers are generated, based on the one or more input tables. Such one or more triggers are then installed in connection with an application configured for modifying the database. In response to at least one of the one or more triggers being triggered, one or more modifications to the database are tracked. Further, information is stored where such information is associated with the one or more modifications to the database.

DETAILED DESCRIPTION

Figure 1:
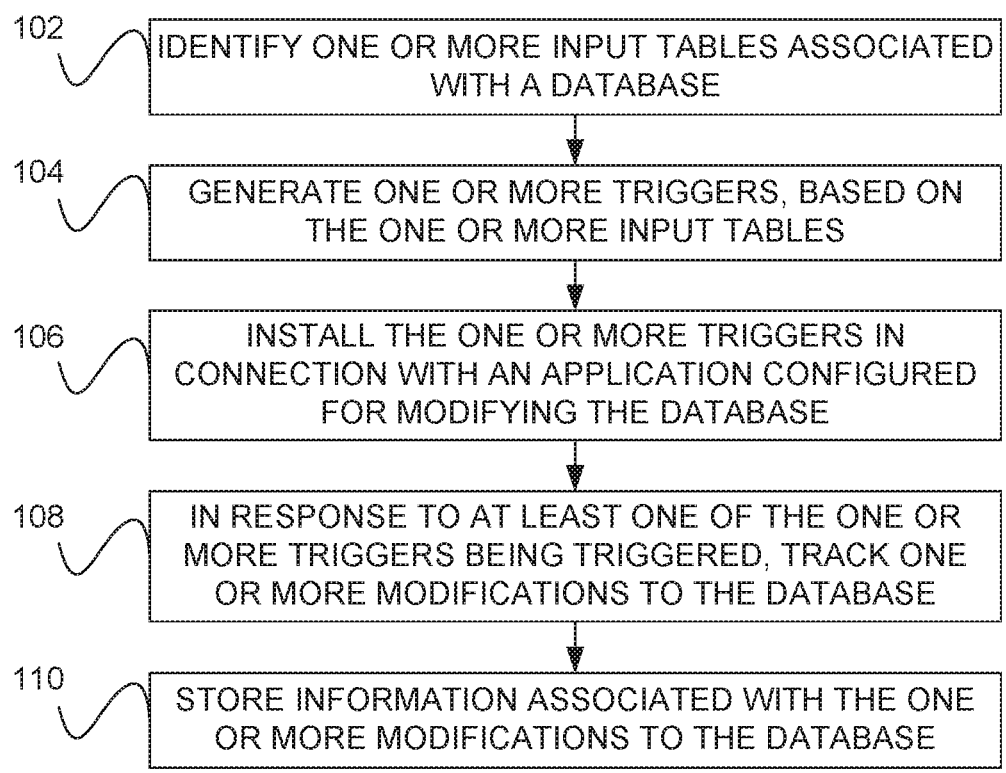
FIG. 1 illustrates a method for trigger-based tracking of database modifications, in accordance with one embodiment.

FIG. 1 illustrates a method 100 for trigger-based tracking of database modifications, in accordance with one embodiment. As shown, the method 100 includes the identification of one or more input tables associated with a database, operation 102. In the context of the present description, the aforementioned one or more input tables may each include any data structure that includes information on any changes (additions, deletions, modifications) to a database. Further, the identification of such input tables may occur in any desired manner (e.g. a push or pull mechanism, a look-up operation in a predetermined folder, etc.). Still yet, the input table may be stored in any of multiple locations when identified (e.g. as part of an application, the database, etc.).

In operation 104, one or more triggers are generated, based on the one or more input tables. In the present description, such triggers may include any data structure and/or code that is capable of being used to trigger subsequent processing. Further, the trigger(s) may be generated in any desired manner that is based on the one or more input tables. For example, the data structure and/or code may, in one embodiment, be generated using a template or automated script generator that processes the input table(s) in a manner that allows the trigger(s) to occur when any change occurs to the database.

After generation, the one or more triggers are then installed in connection with an application configured for modifying the database. See operation 106. As an option, the trigger(s) may be installed by itself and/or with other accompanying software/data (e.g. plug-in, script, interface, etc.) that, in turn, is installed in connection with the application (e.g. by becoming pan or an add-on of the application, by interfacing with the application, etc.). Further, it should be noted that, in the context of the present description, the application may include any software that is designed to make changes to a database.

In response to at least one of the one or more triggers being triggered, one or more modifications to the database are tracked per operation 108. In one embodiment, the triggers(s) may be triggered based on execution of database mark-up language (DML) operations. For example, to the extent that DML code is executed to cause operations on the database in connection with the input table, the triggers may monitor and/or otherwise "hook" such DML code/operations, for the purpose of triggering the trigger(s).

As an option, in one embodiment, the aforementioned application, after the installation of the one or more triggers, is capable of switching between a first mode of operation for tracking the one or more modifications to the database and a second mode of operation for avoiding the tracking. Further, the switching between such different modes may be under the control of the application. More information regarding such feature will be set forth in greater detail during reference to other embodiments outlined in subsequent figures.

Once triggered, the database modification(s) may be tracked in any desired manner that allows for the storage and possible subsequent use of such data involved in such database modification(s). In one embodiment, the tracking may enable the database modification(s) (and any data associated therewith) to be stored as storage. For example, such storage may be a database separate from the aforementioned database (that was the subject of the database modification(s)). As an option, such storage may take the form of a log table.

To this end, per operation 110, information associated with the database modification(s) is stored. In various embodiments, such information may include any description of the database modification(s), data subject of the database modification(s), and/or any other information that may be derived from tracking the database modification(s). Just by way of example, in various embodiments, the information may include a timestamp, a sequence identifier, data that is subject of the modification, etc.

By this design, the information stored in operation 110 may be used in any desired manner. For example, as will be described later in the context of subsequent embodiments, a report on the one or more modifications to the database may be generated, utilizing the information. As another option, a subset of the information associated with the one or more modifications to the database may be extracted, and packaged into a file. Still yet, the file may be validated against one or more database schemas of one or more other separate database. Further, a list of tables may be built for the file, for use in rolling back any failed deployment of the file. To this end, the file may be deployed to the one or more other separate database, based on the validation. As a further option, the file may be deployed to the separate databases simultaneously.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
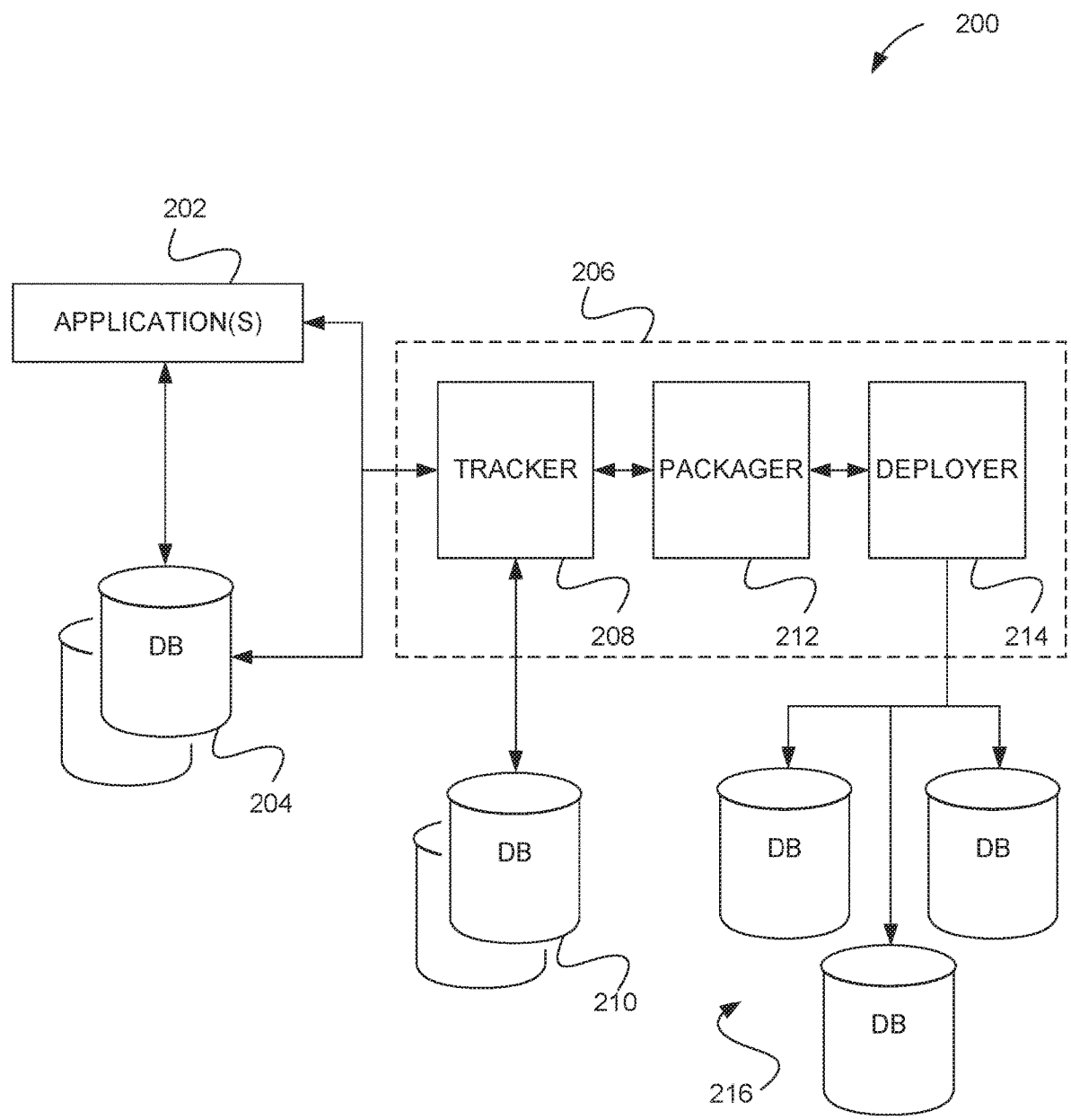
FIG. 2 illustrates a system trigger-based tracking of database modifications, in accordance with one embodiment.

FIG. 2 illustrates a system 200 trigger-based tracking of database modifications, in accordance with one embodiment. As an option, the system 200 may be implemented in the context of any one or more of the embodiments set forth in any previous and/or subsequent figure(s) and/or description thereof. However, it is to be appreciated that the system 200 may be implemented in the context of any desired environment.

As shown, one or more applications 202 are provided for accessing and making modifications to one or more first databases 204. In communication with the application(s) 202 and/or the first database(s) 204 is an apparatus 206 including a plurality of components for tracking the aforementioned modifications to the first database(s) 204 carried out by the application(s) 202. To accomplish this, the apparatus 206 includes a tracker module 208 that has access to one or more second databases 210 for storing information, the second database(s) 210 being associated with the database modification(s) to the first database(s) 204 made by the application(s) 202.

The apparatus 206 further includes a packager module 212 in communication with the tracker module 208 for packaging at least a portion of the aforementioned information (collected by the tracker module 208) into a package file. Still yet, the apparatus 206 further includes a deployer module 214 that includes services to deploy the package file to one or more third databases 216 after some processing (e.g. validation, etc.).

Thus, the system 200 is configured to: (i) perform entire data changes on a separate database associated within a development or master reference data environment, (ii) pack such changes and quickly deploy the same, and (iii) perform tests on staging environments. Once the package is tested successfully, it is ready to be deployed on a production system and/or any other equivalent target, while all the data changes are tracked and recorded. Decision exit points may also be provided to review the changes before the implementation into a desired system.

To this end, the system 200 is a database trigger-based solution. It may be attached to a data development area and may track each data change done by multiples sources on a database level. It is thereby transparent with respect to a main application process and records changes implicitly in a pre-build tracking log table while tracking such changes sequentially with the right order. In use, each committed set of data changes is committed, packed, and deployed to pre-defined target system(s). More information will now be set forth regarding the operation of each of the foregoing components.

Figure 3:
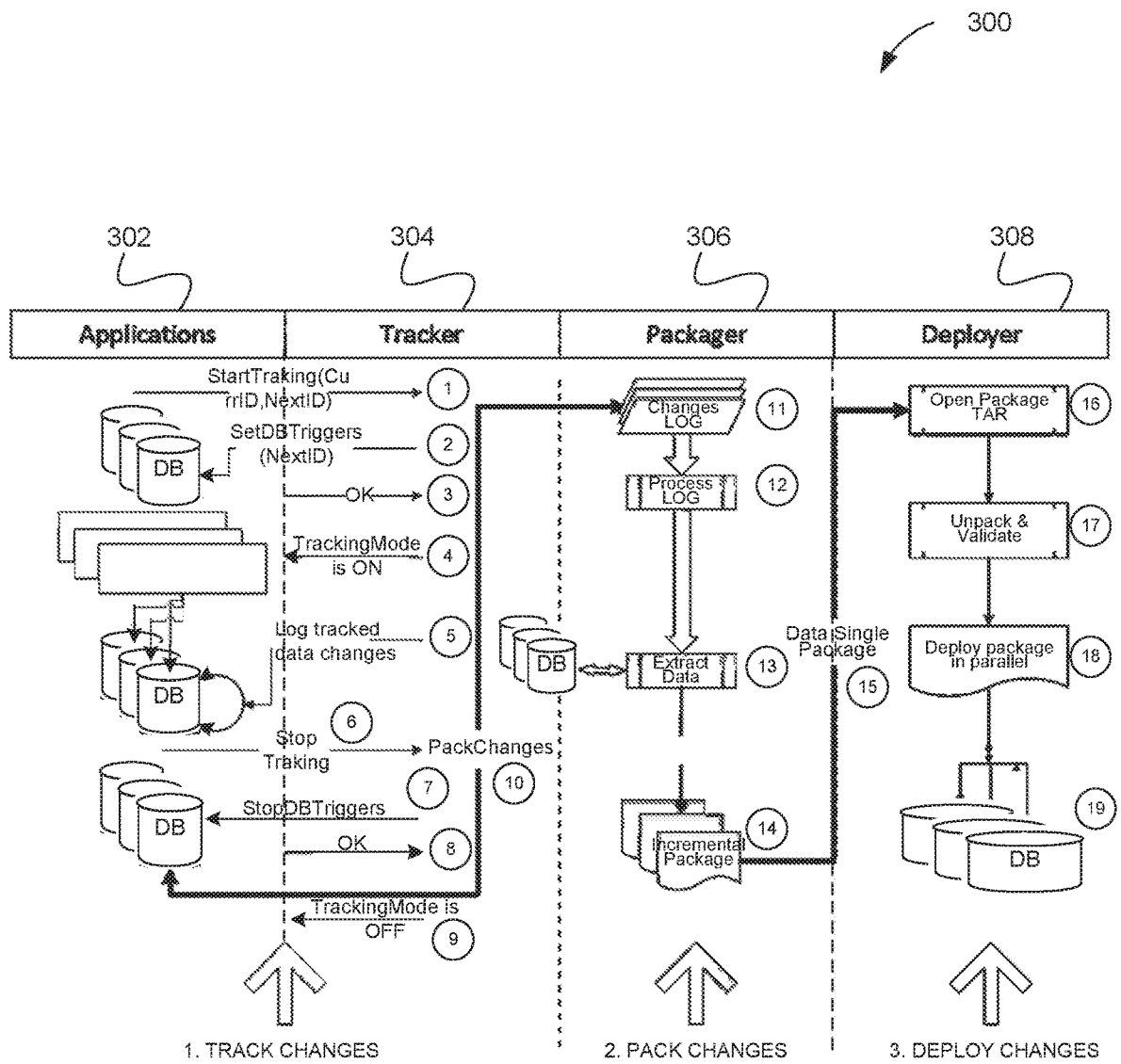
FIG. 3 illustrates operation of a system for trigger-based tracking of database modifications, in accordance with one embodiment.

FIG. 3 illustrates operation of a system 300 for trigger-based tracking of database modifications, in accordance with one embodiment. As an option, the system 200 may be implemented in the context of any one or more of the embodiments set forth in any previous and/or subsequent figure(s) and/or description thereof. For example, the operation set forth in FIG. 3 may reflect an operation of the system 200 of FIG. 2. However, it is to be appreciated that the system 200 may be implemented in the context of any desired environment.

As shown, similar to the system 200 of FIG. 2, the system 300 includes one or more applications 302, a tracker module 304, a packager module 306, and a deployer module 308. The tracker module 304 includes database trigger-based code that captures any changes that are done on a database table level and records the same in a predefined log table. The tracker module 304 is explicitly or implicitly used by the application(s) 302 in order to activate the tracker module 304 right before activating the code that is responsible for modifying the database (e.g. first database(s) 204 of FIG. 2, etc.) and to deactivate the same once completed. As long as the triggers are activated, the data changes are accumulated in a log table.

In use, the data flow is driven by the application(s) 302 (and not necessarily by the tracker module 304, in one possible embodiment), such that the application(s) 302 triggers the tracker module 304 on and off as needed. Any type of information may be recorded this way, including, but not limited to, applicative information, session information, system information, timestamp, transactions sequence, etc.

In accordance with one possible example of use in the context of the system 300 of FIG. 3 and, in particular, the application(s) 302 and tracker module 304, the tracker module 304 module, in operation 1, receives input tables for the purpose of generating triggers in operation 2. Upon receipt of such triggers, the application(s) 302 acknowledges the same in operation 3. Under the control of the application(s) 302, a tracking mode may be enabled in operation 4 and, in such mode, data changes may be tracked in operation 5, until the application(s) 302 terminates the aforementioned tracking mode in operation 6. Upon the termination of the tracking mode, the triggers are disabled in operation 7 and such disablement is acknowledged by both the application(s)

302 and the tracker module 304 in operations 8-9. Still yet, as indicated in operation 10, the data changes are stored in a log table.

The tracker module 304 thus generates the core information for subsequent modules (e.g. packager module 306, and a deployer module 308, etc.). This is accomplished by the tracker module 304 being governed by external processes that perform DML (e.g. database transactions) operations on a database and that implicitly fire auto-generate triggers that record any changes. As mentioned earlier, a first step to accomplish this involves the generation of the triggers based on input tables list, where such triggers catch the foregoing DML operations and, accordingly, insert records into the log table, including a timestamp and continue transaction sequence number (e.g. a sequence tracking identifier, etc.). This transaction sequence number may be used to determine a latest operation on a record, during a subsequent process managed by the packager module 306, as will soon become apparent. Once the scenario is done, the tracker module 304 disables or drops the triggers and stops the accumulating. In one possible embodiment, the triggers may remain activated, which may allow the system to keep collecting data changes information. Once the tracker module 304 has completed its tasks (or based on other business-driven logic) or the business decides to extract the incremental changes currently in the system, the packager module 306 is engaged.

The packager module 306 processes the data that is captured (in the log table) during the operation of the tracker module 304. Further, the packager module 306 prepares a package which may be delivered and installed in an equivalent target system, as will soon become apparent. The packager module 306 further prepares all files required for data load processing. For instance. Table 1 illustrates various files that are prepared in such manner.

TABLE 1

Database records content files, via extract transfer load (ETL), e.g. - Oracle DATAPUMP
Deployment configuration files (including records identification, loading configuration setup, etc.)
SQL DML file (correlated with the changes records in the contents files)
Data changes report file (to present the package contents)
Remark files In the case of the database records content files, the packager module 306 generates a filtering mechanism that instructs the ETL (e.g.—Oracle DATAPUMP) to exact the records. Thus, only desired data is extracted and packed by the packager module 306 and later on to be deployed. In one embodiment, the files in Table 1 may be generated for each sub-system/schema that is defined in a runtime profile of the packager module 306, and the packager module 306 generates a single package file which contains the information above in a manner that is ready for deployment.

Thus, in accordance with one possible example of use in the context of the system 300 of FIG. 3 and, in particular, the packager module 306, such module, in operation 11, accesses the data changes in the log table and processes the same in operation 12 so that a subset of the data may be extracted in operation 13. Thus, in operation 14, such extracted data may be packaged into a single package, for being communicated to the deployer module 308 in operation 15. More information regarding such packager module operations will be set forth during the description of the method 400 of FIG. 4.

The deployer module 308 processes the input package file (or files) from the packager module 306 and deploys the same into predefined database schemas. With all information for deployment included in the package file, the deployer module 308 deploys the same package on several products as well as several database schemas per product. Also, the deployer module 308 has the ability to read multiple packages, to validate, and to deploy the same in the correct order.

Thus, in accordance with one possible example of use in the context of the system 300 of FIG. 3 and, in particular, the deployer module 308, such module, in operation 16, receives and opens the package file or several package files (e.g. TAR file(s), etc.), in order to deploy them, one by one, on a predefined database schemas list. In operation 17, the deployer module 308 unpacks the package file(s) for validation purposes. Specifically, the deployer module 308 obtains sequence tracking information from the package file and validates such number against all of the target database schemas. To validate, the deployer module 308 ensures that a sequence tracking identifier in the package matches a current tracking sequence on each schema. The deployer module 308 also checks and confirms a data loading configuration for all targets for the upcoming data loading. Further, when multiple packages are being validated, the deployer module 308 validates the sequential order of all packages.

Once all validation has passed, the deployer module 308 builds a table(s) lists based on the package information, and performs backups of the table(s) that are going to be changed during deployment. This may be done in order to preserve an ability to roll back to the current backup point in case of any failure during deployment. After backup, the deployer module 308 starts sub-processes in parallel, and starts the deployment. See operations 18-19. More information regarding such deployer module operations will be set forth during the description of the method 500 of FIG. 5.

Figure 4:
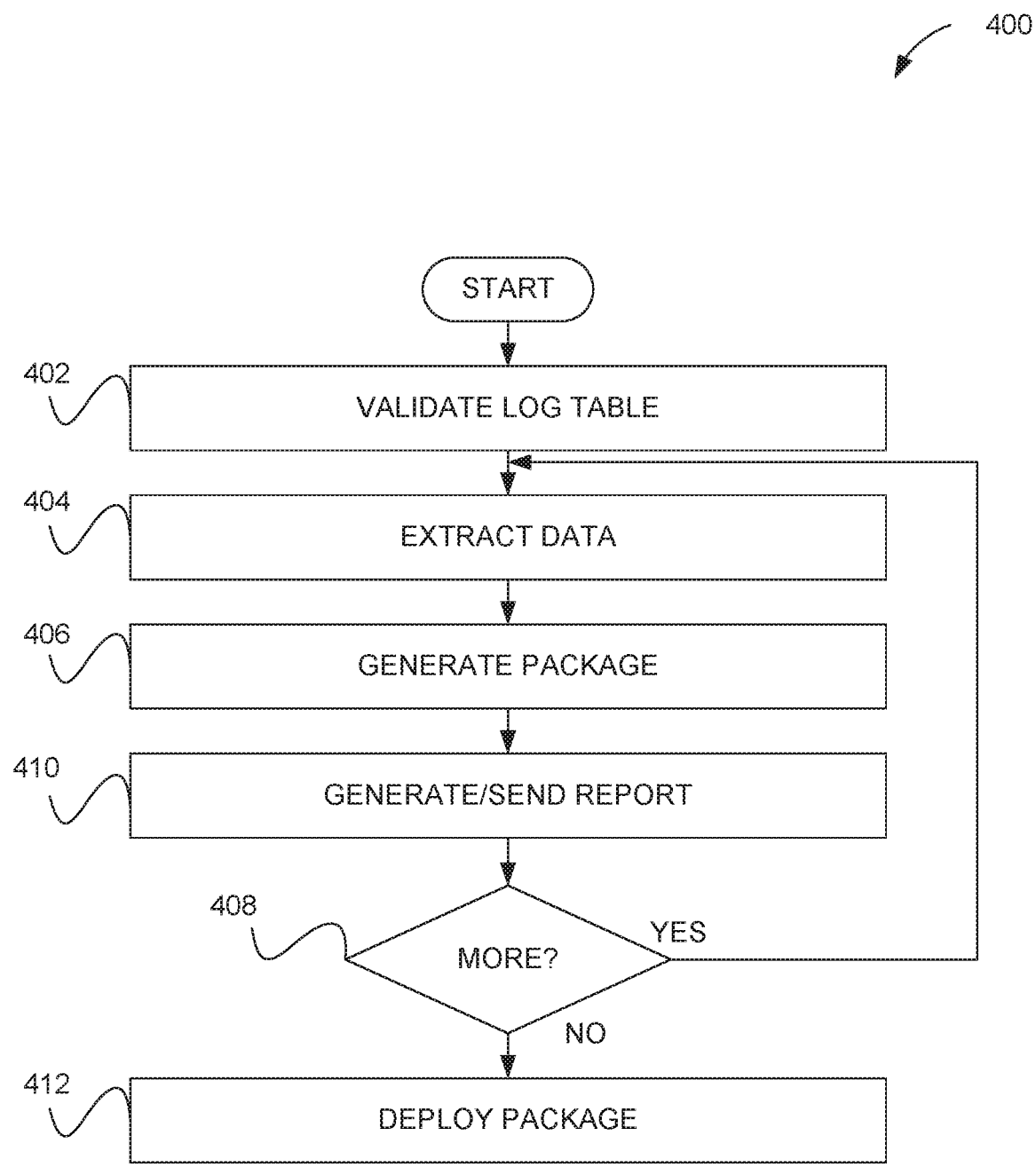
FIG. 4 illustrates operation of a packager module method, in accordance with one embodiment.

FIG. 4 illustrates operation of a packager module method 400, in accordance with one embodiment. As an option, the method 400 may be implemented in the context of any one or more of the embodiments set forth in any previous and/or subsequent figure(s) and/or description thereof. For example, the method 400 may reflect an operation of the packager module 212 of FIG. 2 and/or the packager module 306 of FIG. 3. However, it is to be appreciated that the method 400 may be implemented in the context of any desired environment.

As shown, the method 400 begins by validating the log table (e.g. including determining whether it contains changes), per operation 402. In an environment involving a multi-source/database configuration, it may also be confirmed that the sequential identification on all source schemas are correlated. Based on the information in the logic table, the following information in Table 2 is generated.

TABLE 2

Unique package identification
List of tables for extraction
Specific table query to perform an incremental data export
Default HTML detailed report for the data changes
(and provide interface to support any other formats)
Data loading runtime configuration parameters files
(for both packager/deployer modules).

Once the pre-packaging validation has passed, the method 400 continues by starting the actual extraction of data in operation 404 based on the configuration files that were generated in operation 402. Further, sub-processes are incrementally extracted for all predefined database schemas/products. Thereafter, data content files are received from a local directory, and packed together in a single package file.

In addition, a report is generated for all changes in operation 410. As an option, such report may be sent to a predefined email/contact list. As shown, operations 402-410 may be repeated for each package to be created, per decision 408. Thereafter, the package file(s) is ready for delivery and deployment, per operation 412.

Figure 5:
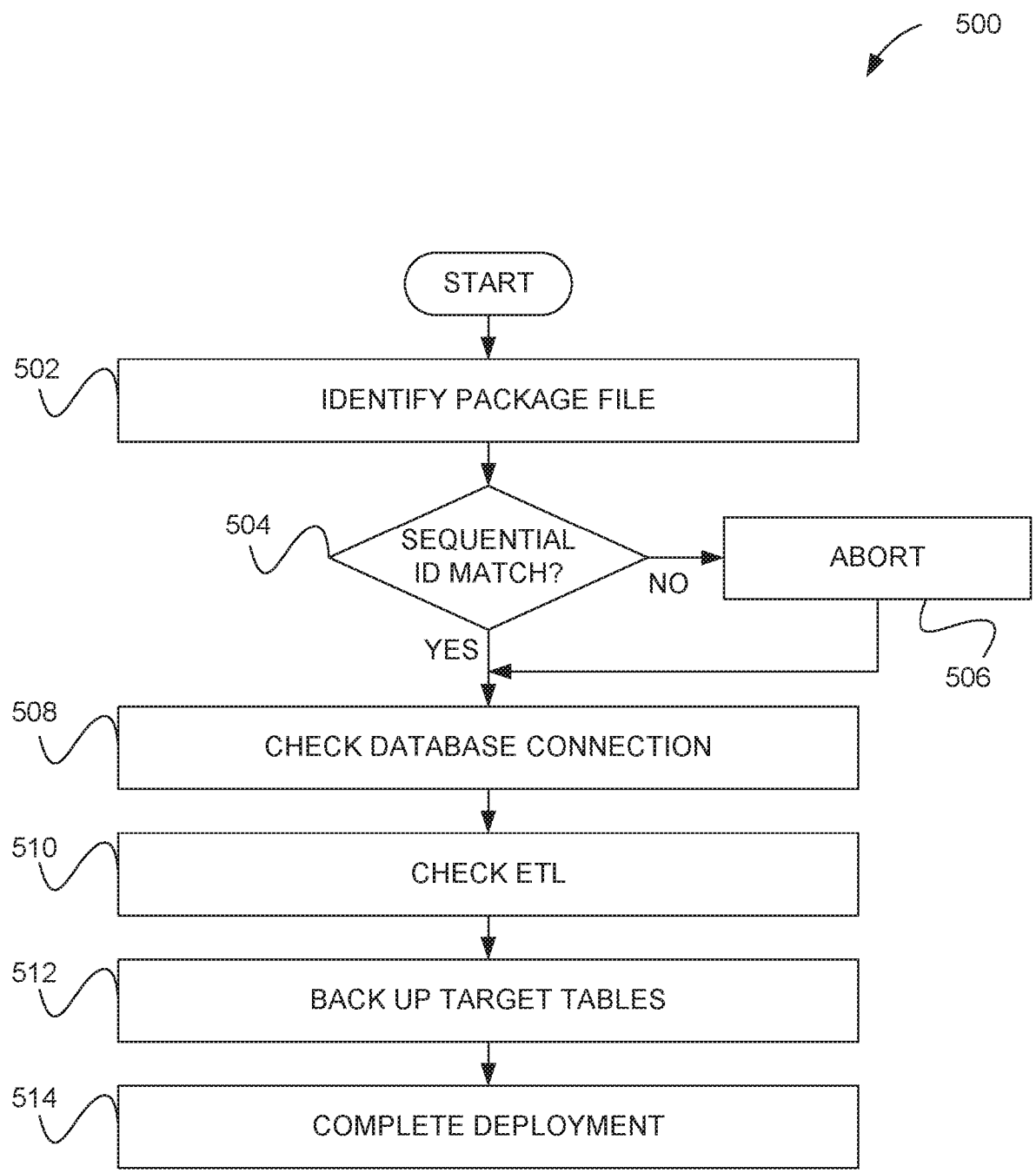
FIG. 5 illustrates operation of a deployer module method, in accordance with one embodiment.

FIG. 5 illustrates operation of a deployer module method 500, in accordance with one embodiment. As an option, the method 500 may be implemented in the context of any one or more of the embodiments set forth in any previous and/or subsequent figure(s) and/or description thereof. For example, the method 500 may reflect an operation of the deployer module 214 of FIG. 2 and/or the deployer module 308 of FIG. 3. However, it is to be appreciated that the method 500 may be implemented in the context of any desired environment.

As shown, the method 500 begins in operation 502 by identifying a package file(s) (e.g. that is ready for deployment per operation 412 of FIG. 4, etc.). In decision 504, it is determined whether the input package sequential identifier and that of the target schema match, in order to ensure that a proper deployment order is adhered to (i.e. so it will be deployed sequentially). If not, deployment is aborted until there is a match per operation 506.

Further, in operation 508, it is confirmed that database connection details are valid and the database connection can be accomplished. Still yet, in operation 510, the ETL (e.g.— Oracle DATAPUMP) is checked to ensure that it is configured and can be activated appropriately. Specifically, it is confirmed that the identifier in the target database matches the identifier in the deployment package. It should be noted that these checks are activated during a pre-deployment phase in order to eliminate, in advance, potential error or failures (and to ensure smooth deployment).

With continuing reference to FIG. 5, the target tables are backed up in operation 512. This allows for automatic rollback in case of failure. Thereafter, deployment is completed per operation 514 after additional steps are performed, including, but not limited to, determining where each data contents file is located, in connection with its related server. Further, relevant records are deleted by primary-key, as defined in the package files. Such files are those that will be replaced with new records that exist in the package to be deployed. Further, before an actual import, a dynamic external operation may optionally be performed on the database.

By this design, all imports may be done in parallel while the deployer module waits for all to finish successfully, before going to next step. Again, in case of failure, all database schemas may be rolled backed to the initial backup point. Once all imports are complete, the deployer module retrieves the next package, if any, and all operations (except the backup) are repeated. When all are complete, the deployer module updates the new package sequential identifier in the database and completes the process.

The above techniques thus overcome challenges by capturing exact database changes that were made, with the ability to track and record each extraction in an intelligent and efficient way. Also, all sub-system databases are synchronized using a unique tracking identifier for each extraction toward the deployment in the equivalent production system. Further, any data change (e.g. new, delete, update, etc.) in connection with the database are tracked. Further, the modified records from the database are incrementally extracted to files, and the whole data is packed within a single package file for delivery. Still yet, the package is deployed into the multiples database targets in a manner that ensures data consistency while maintaining tracking identification for each logical data package (across distributed sub-systems).

This design thus incrementally extracts and deploys data with an ability also to export character large objects (CLOB) and binary large objects (BLOB). A row level extract process may also be used to dramatically reduce timing and storage consumption in connection with data extracts at the schema- or table-level. Further, full tracking and reporting abilities are included which provide information for a business on upcoming new data, before the actual deployment. Thus, in various embodiments, various possible features are available.

Firstly, data may be selected and transferred from one or more database sources in a manner that enables fast and smooth data transfer with full control on the transferred data. Further, a fully automated tracking mechanism (with no manual processing/involvement, in one embodiment) may be provided, in order to identify the exact changed data and the log for packaging and deployment purposes via later stages.

Secondly, using tracking techniques by instrumenting the user interface of the application, certain scenarios from an end user may be recorded for use in connection with an automation packaging and deployment tool for replaying those scenarios to any equivalent database targets. In one possible embodiment, this may be accomplished in a manner independent on any user interface being implemented.

Thirdly, using tracking and packaging techniques, various scenarios may be accommodated where lots of changes are related to the same tables, and/or the same record is changed multiple times (which makes an analysis process more complicated and might affect data inconsistency in deployment stage). The various techniques disclosed herein are designed to handle such changes in an optimized way and further to pack and deploy only the most up-to-date data in a single record level.

Figure 6:
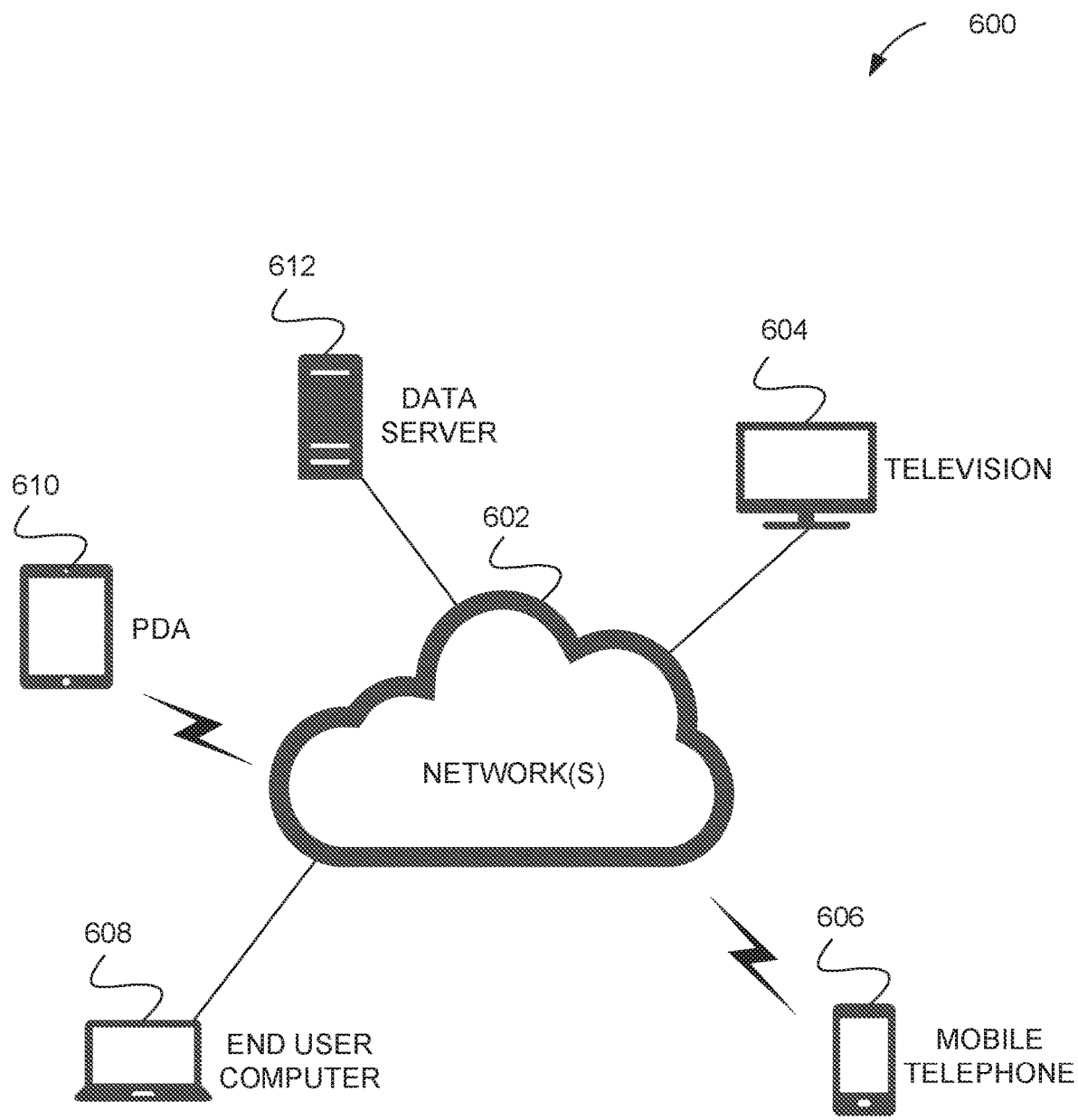
FIG. 6 illustrates a network architecture, in accordance with one possible embodiment.

FIG. 6 illustrates a network architecture 600, in accordance with one embodiment. As shown, at least one network 602 is provided. In various embodiments, any one or more components/features set forth during the description of any previous figure(s) may be implemented in connection with any one or more of the components of the at least one network 602.

In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 612 and an end user computer 608 may be coupled to the network 602 for communication purposes. Such end user computer 608 may include a desktop computer, lap-top computer, and/or any other type of logic. Still yet, various other devices may be coupled to the network 602 including a personal digital assistant (PDA) device 610, a mobile phone device 606, a television 604, etc.

Figure 7:
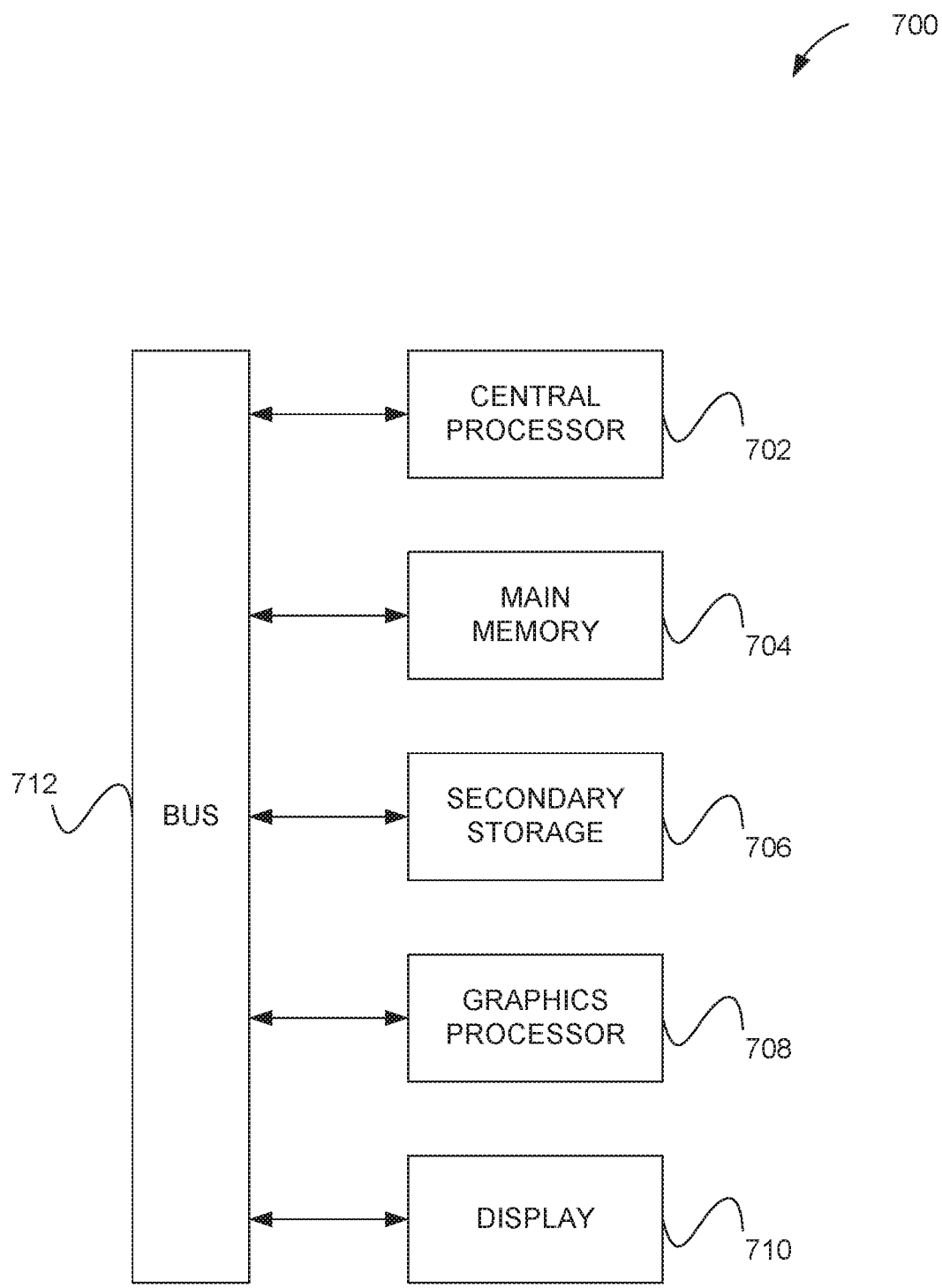
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. However, it is to be appreciated that the system 700 may be implemented in any desired environment.

As shown, a system 700 is provided including at least one central processor 702 which is connected to a bus 712. The system 700 also includes main memory 704 [e.g., hard disk drive, solid state drive, random access memory (RAM), etc.]. The system 700 also includes a graphics processor 708 and a display 710.

The system 700 may also include a secondary storage 706. The secondary storage 706 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 706, and/or any other memory, for that matter. Such computer programs, when executed, enable the system 700 to perform various functions (as set forth above, for example). Memory 704, secondary storage 706 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer program product comprising computer executable instructions stored on a non-transitory computer readable medium that when executed by a processor instruct the processor to:
   identify, by a system, one or more input tables of a database;
   generate, by the system, one or more triggers for the one or more input tables, the one or more triggers executable to cause the system to catch operations that modify the one or more input tables of the database;
   install, by the system, the one or more triggers in connection with an application configured for modifying the database;
   in response to at least one of the one or more triggers being triggered by the application, track, by the system, one or more modifications made to the one or more input tables of the database by the application, including for each of the one or more modifications made to the one or more input tables of the database by the application:
   insert, into a log table by the system, a record of the modification that includes a timestamp and a transaction sequence number;
   extract, by the system from the log table, a subset of the records in the log table that reflect the latest data in the database, using the transaction sequence number stored in each record of the log table;
   pack, by system into a package file, the subset of the records extracted from the log table;
   validate, by the system, the package file against a database schema of each of a plurality of additional databases to which the package file is to be deployed;
   responsive to validating the package file, simultaneously deploy, by the system, the package file to the plurality of additional databases for making the modifications recorded in the package file to each of the plurality of additional databases;
   wherein the application, after the installation of the one or more triggers, is capable of switching the system between a first mode of operation for tracking the one or more modifications made to the one or more input tables of the database and a second mode of operation for avoiding the tracking.

2. The computer program product of claim 1, wherein the operations are database mark-up language (DML) operations.

3. A method, comprising:
   identifying, by a system, one or more input tables of a database;
   generating, by the system, one or more triggers for the one or more input tables, the one or more triggers executable to cause the system to catch operations that modify the one or more input tables of the database;
   installing, by the system, the one or more triggers in connection with an application configured for modifying the database;
   in response to at least one of the one or more triggers being triggered by the application, tracking, by the system, one or more modifications made to the one or more input tables of the database by the application, including for each of the one or more modifications made to the one or more input tables of the database by the application:
   insert, into a log table by the system, a record of the modification that includes a timestamp and a transaction sequence number;
   extracting, by the system from the log table, a subset of the records in the log table that reflect the latest data in the database, using the transaction sequence number stored in each record of the log table;
   packing, by the system into a package file, the subset of the records extracted from the log table;
   validating, by the system, the package file against a database schema of each of a plurality of additional databases to which the package file is to be deployed;
   responsive to validating the package file, simultaneously deploying, by the system, the package file to the plurality of additional databases for making the modifications recorded in the package file to each of the plurality of additional databases;
   wherein the application, after the installation of the one or more triggers, is capable of switching the system between a first mode of operation for tracking the one or more modifications made to the one or more input tables of the database and a second mode of operation for avoiding the tracking.

4. A system, comprising:
   at least one processor configured to:
   identify, by the system, one or more input tables of a database;
   generate, by the system, one or more triggers for the one or more input tables, the one or more triggers executable to cause the system to catch database mark-up language (DML) operations that modify the one or more input tables of the database;
   install, by the system, the one or more triggers in connection with an application configured for modifying the database;
   in response to at least one of the one or more triggers being triggered by the application, track, by the system, one or more modifications made to the one or more input tables of the database by the application, including for each of the one or more modifications made to the one or more input tables of the database by the application:
   insert, into a log table by the system, a record of the modification that includes a timestamp and a transaction sequence number;
   extract, by the system from the log table, a subset of the records in the log table that reflect the latest data in the database, using the transaction sequence number stored in each record of the log table;

pack, by the system into a package file, the subset of the records extracted from the log table;

validate, by the system, the package file against a database schema of each of a plurality of additional databases to which the package file is to be deployed;

responsive to validating the package file, simultaneously deploy, by the system, the package file to the plurality of additional databases for making the modifications recorded in the package file to each of the plurality of additional databases.

5. The computer program product of claim 1, wherein the system validates the package file by:

unpacking the package file, obtaining the transaction sequence numbers from the unpacked package file, and validating the transaction sequence numbers against the database schema of the additional database.

6. The computer program product of claim 1, wherein responsive to validating the package file, the system further builds a table list based on the package file and, based on the table list, performs backups of one or more additional tables in the additional database that will be modified via deployment of the package file to preserve an ability to roll the additional database back in case of a failure during the deployment of the package file.

7. The computer program product of claim 1, wherein the database is associated with a development environment, and wherein the plurality of additional databases are associated with a production system.

8. The computer program product of claim 1, wherein the one or more triggers are further installed by the system in connection with at least one additional application configured for modifying the one or more input tables of the database, wherein additional modifications made to the one or more input tables of the database by the at least one additional application are tracked to insert into the log table a record of the additional modifications.

9. The computer program product of claim 1, wherein the log table tracks the modifications sequentially with a correct order.

10. The computer program product of claim 1, wherein the one or more triggers are activated right before activating code in the application that is responsible for making the one or more modifications to the one or more input tables of the database, and wherein the one or more triggers are deactivated once the one or more modifications to the one or more input tables of the database are completed.

11. The computer program product of claim 1, wherein the one or more input tables of the database are identified from an input tables list.

12. The computer program product of claim 1, wherein the transaction sequence number stored in each record of the log table is used to determine a latest operation on each record of the database which in turn is the basis used for extracting the subset of the records in the log table that reflect the latest data in the database.

\* \* \* \* \*